US007890210B2

(12) United States Patent  (10) Patent No.: US 7,890,210 B2
Choi et al.  (45) Date of Patent: Feb. 15, 2011

(54) NETWORK-BASED ROBOT CONTROL SYSTEM AND ROBOT VELOCITY CONTROL METHOD IN THE NETWORK-BASED ROBOT CONTROL SYSTEM

(75) Inventors: Byung-Kwon Choi, Seoul (KR); Hyun-Sik Shim, Yongin-si (KR); Joon-Koo Kim, Seoul (KR)

(73) Assignee: Samsung Electronics Co., Ltd (KR)

( * ) Notice: Subject to any disclaimer, the term of this patent is extended or adjusted under 35 U.S.C. 154(b) by 1231 days.

(21) Appl. No.: 11/395,768

(22) Filed: Mar. 31, 2006

(65) Prior Publication Data

US 2006/0271238 A1  Nov. 30, 2006

(30) Foreign Application Priority Data

May 24, 2005  (KR) ............... 10-2005-0043722

(51) Int. Cl.
G06F 19/00  (2011.01)
(52) U.S. Cl. ............... 700/245; 382/103; 382/107
(58) Field of Classification Search ............ 700/245
See application file for complete search history.

(56) References Cited

U.S. PATENT DOCUMENTS 5,684,887 A * 11/1997 Lee et al. .............. 382/107
2002/0161480 A1 * 10/2002 Kakutani et al. ........... 700/245
2003/0036817 A1 * 2/2003 Morley et al. ............ 700/245
2003/0114962 A1 * 6/2003 Niemeyer ............... 700/245
2004/0093122 A1 * 5/2004 Galibraith ............... 700/245
2005/0041839 A1 * 2/2005 Saitou et al. ............ 382/103

FOREIGN PATENT DOCUMENTS

| JP | 08-256318 | 10/1996 |
| JP | 2000-184469 | 6/2000 |
| JP | 2004-208001 | 7/2004 |

* cited by examiner

Primary Examiner—Khoi Tran
Assistant Examiner—Rodney King
(74) Attorney, Agent, or Firm—The Farrell Law Firm, LLP

(57) ABSTRACT

Provided are a network-based robot control system and a robot velocity control method in the network-based robot control system. A client calculates a robot control velocity according to its reception state of video data frames captured by a robot, generates a robot control message including the calculated robot control velocity, and transmits the robot control message to the robot. The robot then changes its velocity according to the robot control velocity included in the received robot control message. In this way, the velocity of the robot is controlled according to the video data reception state of the client, thereby allowing a user to easily control the robot regardless of the performance of the client.

27 Claims, 6 Drawing Sheets

NETWORK-BASED ROBOT CONTROL SYSTEM AND ROBOT VELOCITY CONTROL METHOD IN THE NETWORK-BASED ROBOT CONTROL SYSTEM

PRIORITY

This application claims priority under 35 U.S.C. §119 to an application entitled "Network-Based Robot Control System and Robot Velocity Control Method in the Network-Based Robot Control System" filed in the Korean Intellectual Property Office on May 24, 2005 and assigned Serial No. 2005-43722, the entire contents of which are incorporated herein by reference.

BACKGROUND OF THE INVENTION

1. Field of the Invention

The present invention generally relates to a robot control system, and in particular, to a network-based robot control system such as a Ubiquitous Robotic Companion (URC) and a robot velocity control method in the network-based robot control system.

2. Description of the Related Art

A mechanical apparatus which automatically makes a determination and carries out certain operations in accordance with specific instructions using sensors corresponding to human senses is referred to as a "robot". Conventional robots are now evolving into human robots such as a cleaning robot and a toy robot, according to tasks assigned by users, and are being developed to do multiple functions at the same time.

A robot is designed to provide various services through communication with human beings. Recently, a network-based robot control system such as a Ubiquitous Robotic Companion (URC) system has been developed.

In a network-based robot control system, a user can remotely control a robot using a client such as a Personal Digital Assistant (PDA), a web pad, a cellular phone, or a Personal Computer (PC). The client remotely controls the robot through a wired/wireless network such as an Internet network, a Wireless Local Area Network (W-LAN), or a mobile communication network (CDMA, GSM) at the request of the user. The robot performs an action under the control of the client and provides data to the client in general video data. Thus, the user can control the robot while viewing an image from the robot on a screen of the client.

The performance of a processor varies from client to client and different communication environments are used for different clients. For example, a PC has superior processor performance and data transmission velocity, whereas a cellular phone or a PDA has lower processor performance and data transmission velocity.

When the same video data frames are provided by the robot to different clients, a client having a high data reception velocity can successfully receive and process the video data frames. Meanwhile, a client having low processor performance and data reception velocity may fail to receive the video data frames or cannot process the received video data frames, resulting in interruption in its operation or the occurrence of an error.

Thus, conventionally, the number of data frames per second or video data quality is adjusted for each client according to the data reception velocity and processor performance of the client.

For example, when a client having superior processor performance and high data reception velocity rapidly receives video data frames from a robot and process the received video data frames, the video data frames from the robot are directly transmitted to the client. On the other hand, when a client having low processor performance and data reception velocity slowly receives video data frames from a robot, the video data frames from the robot are transmitted after the number of video data frames is reduced.

In case of the client having superior processor performance and high data reception velocity, an image from the robot is seamlessly and smoothly displayed on a screen of the client due to direct transmission of the video data frames from the robot to the client. However, in case of the client having low processor performance and data reception velocity, an image from the robot is not displayed smoothly and the display of the image is often interrupted because the video data frames are not received entirely at the same time and only some portions thereof are received. As a result, the user cannot determine the current state of the robot with the image displayed on the screen of the client having low processor performance and data reception velocity, and the use will experience difficulty in controlling the robot.

For example, when a robot provides video data frames at a rate of 10 frames per second, the video data frames are provided to a client having superior processing performance such as a PC at a rate of 10 frames per second and are provided to a client having low processing performance such as a cellular phone at a rate lower than 10 frames per second (e.g., at a rate of 5-7 frames per second). In this case, an image displayed on the client having superior processing performance changes at the velocity of the robot, whereas an image displayed on the client having low processing performance changes at a velocity that is much less smooth than the movement velocity of the robot resulting in poor reception, making it difficult for users to control the robot.

SUMMARY OF THE INVENTION

The objective of the present invention to provide a network-based robot control system and a robot velocity control method, in which the velocity of a robot is controlled according to the video data reception state of a client to facilitate user's robot control.

The of the invention also provides a network-based robot control system and a robot velocity control method, in which the velocity of a robot is controlled to be changed with a change in the velocity of an image displayed on a screen of a client.

The present invention provides a network-based robot control system including a robot, a server, and a client. The robot provides video data frames captured by performing a predetermined operation and changes its velocity according to a robot control velocity included in a received robot control message. The server receives the video data frames provided from the robot and processes the received video data frames according to the performance of a client. The client receives the video data frames captured by the robot through the server, calculates the robot control velocity according to its video data frame reception state, generates the robot control message including the robot control velocity, and transmits the robot control message to the robot.

Other aspect of the present invention provides a robot velocity control method in a network-based robot control system. The robot velocity control method includes receiving video data frames captured by a robot, calculating a robot control velocity according to a video data frame reception state, and generating a robot control message including the calculated robot control velocity and transmitting the generated robot control message to the robot.

BRIEF DESCRIPTION OF THE DRAWINGS

The above and other objects, features, and advantages of a certain exemplary embodiment of the present invention will be more apparent from the following description taken in conjunction with the accompanying drawings, in which.

DETAILED DESCRIPTION OF THE PREFERRED EMBODIMENT

A detailed construction and certain elements are provided to assist in a comprehensive understanding of an exemplary embodiment of the invention. Accordingly, those of ordinary skill in the art will recognize that various changes and modifications of the embodiment described herein can be made without departing from the scope and spirit of the invention. Also, descriptions of well-known functions and constructions are omitted for clarity and conciseness.

Figure 1:
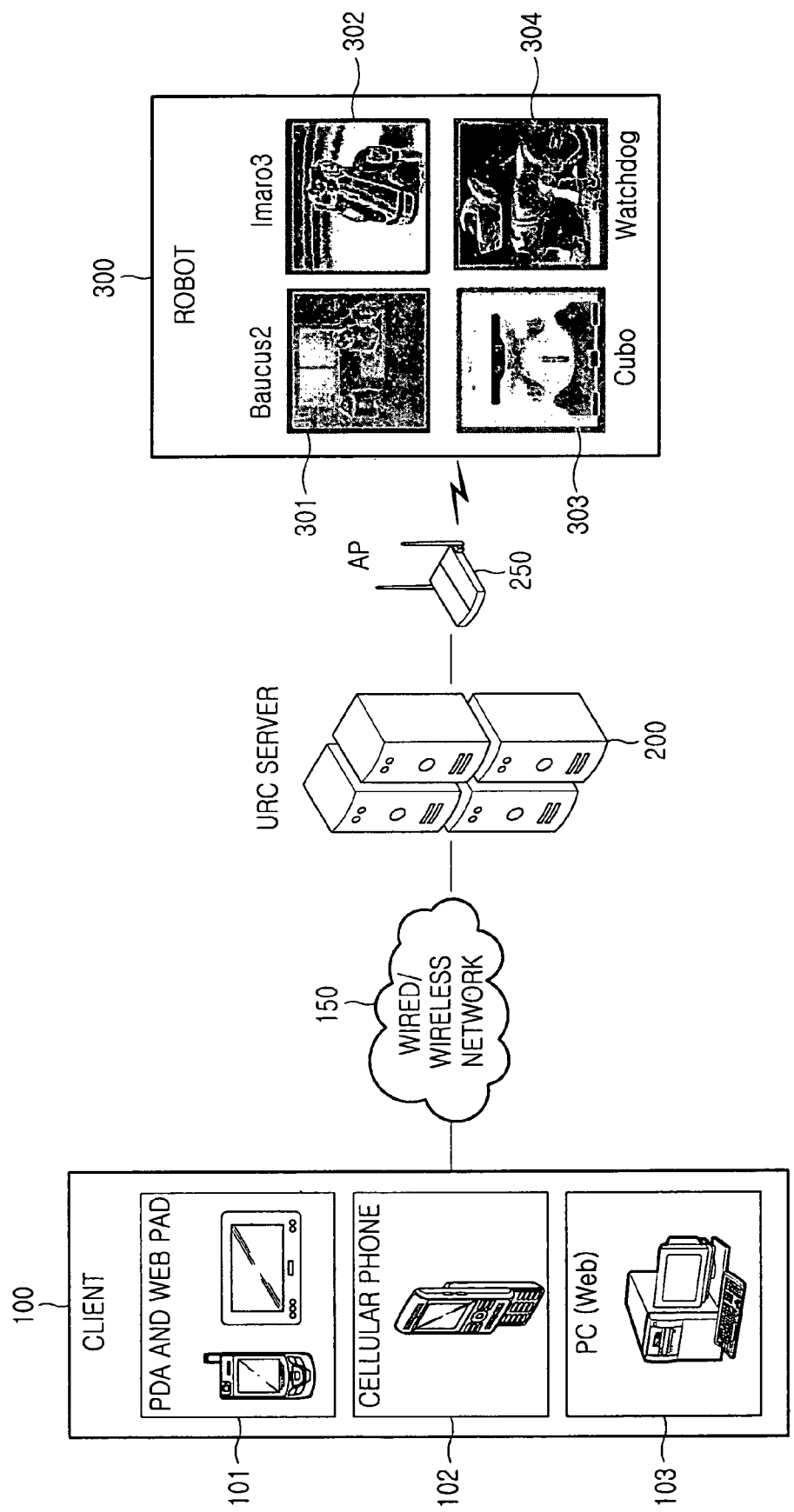
FIG. 1 illustrates a network-based robot control system according to the present invention.

FIG. 1 illustrates a network-based robot control system according to the present invention. Referring to FIG. 1, the network-based robot control system includes a client 100, a wired/wireless network 150, a Ubiquitous Robotic Companion (URC) server 200, an Access Point (AP) 250, and a robot 300.

The client 100 may be a Personal Digital Assistant (PDA) a web pad 101, a cellular phone 102, or a wired/wireless communication terminal such as a Personal Computer (PC) 103 and connects to the URC server 200 through the wired/wireless network 150 at the request of a user for authentication. For authentication, the client 100 provides its ID and password, together with client type information, to the URC server 200. For example, the client 100 provides information indicating a PDA in case of the client 100 being a PDA, information indicating a PC in case of the client 100 being a PC 103, or information indicating a cellular phone in case of the client 100 being a cellular phone 102, to the URC server 200.

The client 100 transmits a robot control message to the URC server 200 and receives video data frames of the robot 300 from the URC server 200. Specifically, the client 100 calculates an appropriate robot control velocity based on the number of video data frames received per second when receiving the video data frames of the robot 300, generates a robot control message including the calculated robot control velocity, and transmits the robot control message to the URC server 200.

The wired/wireless network 150 may be a TCP/IP-based wired/wireless network such as an Internet network, a Wireless Local Area Network (W-LAN), or a mobile communication network (CDMA, GSM), and functions as a data communication path between the client 100 and the URC server 200.

Upon connection of the client 100, the URC server 200 performs authentication, and recognizes the type of client 100 based on the ID and password transmitted from the client 100. The URC server 200 processes and transmits the video data packets of the robot 300 according to the type of the client 100. For example, the URC server 200 adjusts the number of video data frames transmitted from the robot 300 or changes the quality of the video data frames transmitted from the robot 300 according to whether the client 100 is a PC, a PDA, or a cellular phone. The URC server 200 transmits the video data frames processed according to the type of the client to the client 100. The AP 250 is a repeater between the URC server 200 and the robot 300 and enables data transmission/reception between the URC server 200 and the robot 300.

The robot 300 may be an intelligent robot (such as Baucus2 301, Imaro3 302, Cubo 303, or Watchdog 304, manufactured by Samsung Electronics Co., LTD) receives a robot control message from the client 100 through the URC server 200. The robot 300 operates according to a control command included in the received robot control message and transmits video data frames for an image captured during its operation to the URC server 200. The robot 300 changes its velocity (e.g., a movement velocity or a camera velocity) according to a robot control velocity included in the received robot control message.

The network-based robot control system according to the present invention changes the velocity of the robot 300 according to the video data reception state of the client 100, thereby making it possible to seamlessly and smoothly display video data from the robot 300 on a screen of the client 100 even when the video data reception state of the client 100 is not good. Thus, the user can easily control the robot 300 while viewing video data from the robot 300 on the screen of the client 100.

Figure 2:
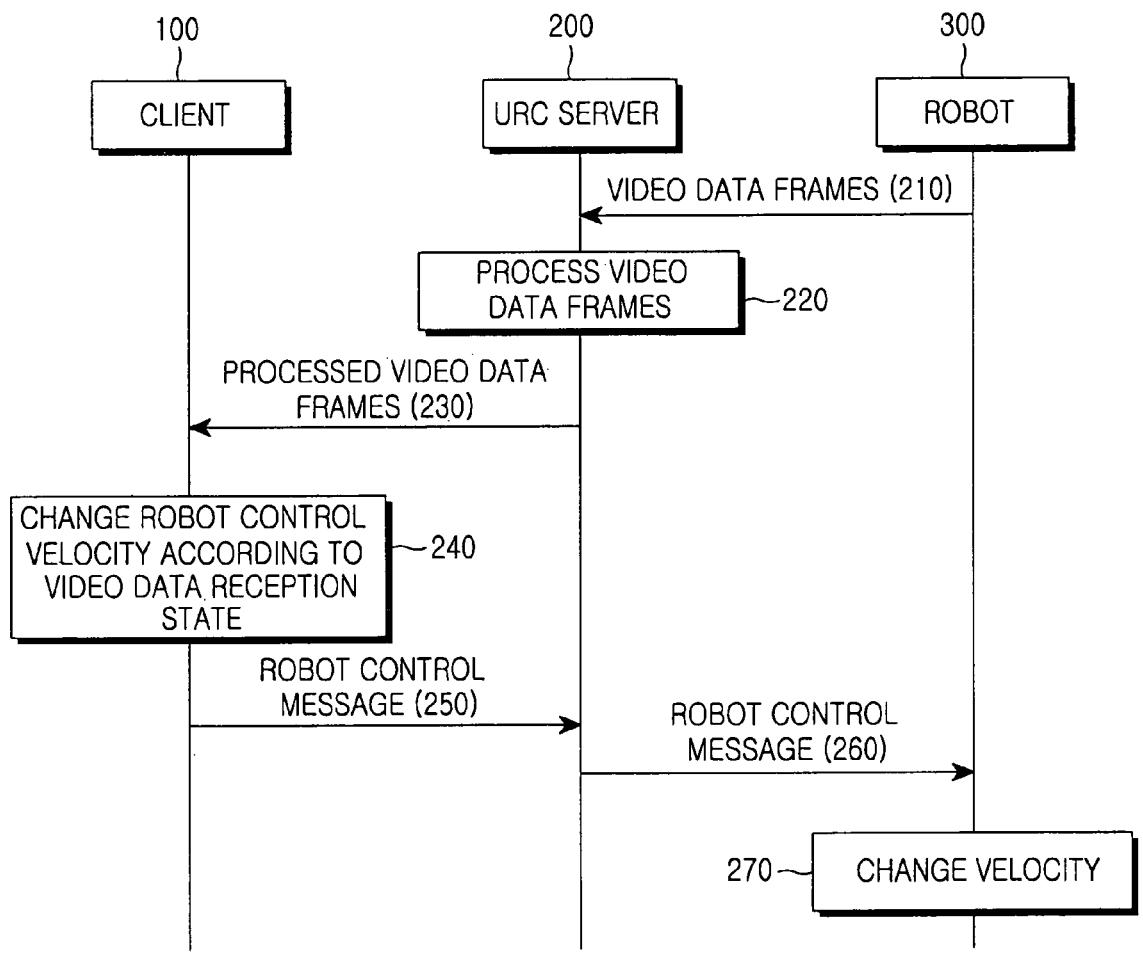
FIG. 2 is a flowchart illustrating a robot velocity control method in a network-based robot control system according to the present invention.

The robot velocity control method in the network-based robot control system as structured above will be described with reference to FIG. 2. FIG. 2 illustrates a robot velocity control method in the network-based robot control system. Referring to FIG. 2, the robot 300 transmits video data frames for an image captured by a camera to the URC server 200 in step 210.

The URC server 200 receives the video data frames from the robot 300 and suitably processes the video data frames for the client 100 in step 220. For example, the URC server 200 adjusts the number of video data frames transmitted from the robot 300 or changes the quality of the video data frames according to whether the client 100 is a PC, a PDA, or a cellular phone. The URC server 200 then transmits the video data frames processed according to the type of client to the client 100 in step 230. For example, when the robot 300 provides video data frames at a rate of 10 frames per second, the URC server 200 provides the video data frames to the client 100 having superior processing performance such as a PC at a rate of 10 frames per second, whereas the URC server 200 provides the video data frames to the client 100 having low processing performance such as a cellular phone after reducing the number of video data frames down to less than 10 frames (e.g., 5-7 frames) or lowers the quality of the video data frames.

When the URC server 200 adjusts the number of video data frames or lowers the quality of the video data frames, a client having high data reception velocity and superior processing performance is provided with a large number of video data frames per second and thus displays a smooth image on its screen. On the other hand, a client having low data reception velocity and low processing performance is provided with a small number of video data frames per second and thus has an interruption in the displayed image. In this case, a video data screen of the robot 300 experiences a large change and is much less smooth, making it difficult for the user to control the robot 300 while viewing the video data screen.

The client 100 changes a robot control velocity according to its video data reception state, i.e., according to whether the number of video data frames received per second is large or small, in step 240. In other words, the client 100 increases the robot control velocity if the number of video data frames is large and reduces the robot control velocity if the number of video data frames is small.

The client 100 transmits the robot control message including the changed robot control velocity to the URC server 200 in step 250. The robot control message includes a control command for a predetermined operation of the robot 300.

The URC server 200 transmits the robot control message received from the client 100 to the robot 300 in step 260. The robot 300 receives the robot control message from the URC server 200 and changes its velocity according to the robot control velocity included in the robot control message in step 270.

Figure 3:
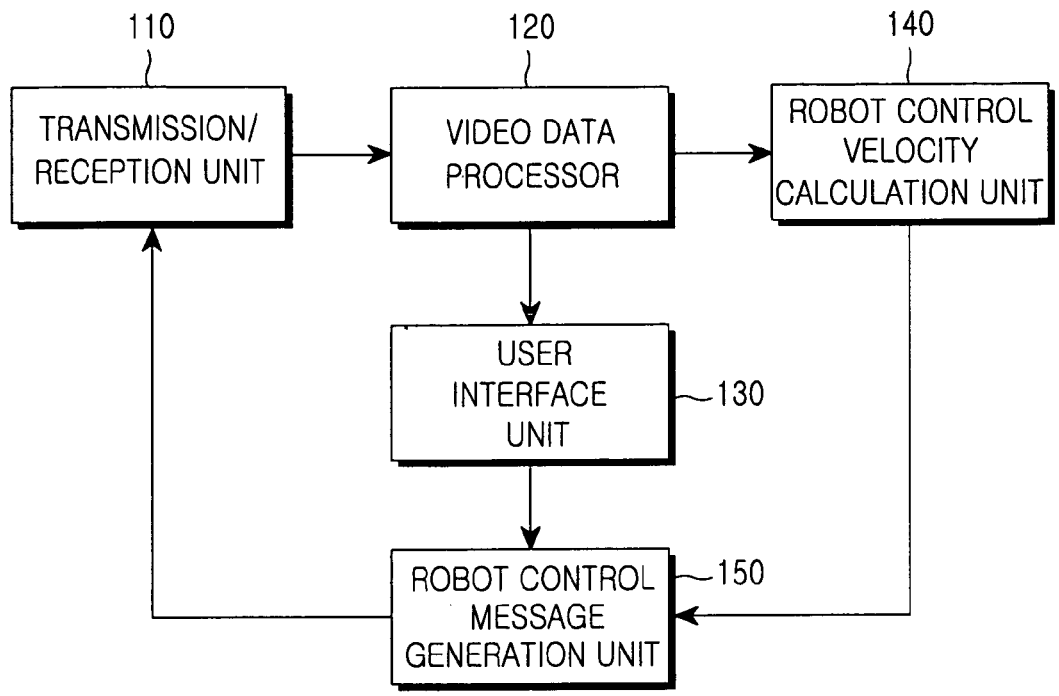
FIG. 3 is a block diagram of a client according to the present invention.

Hereinafter, the configuration and operation of the client 100 according to the present invention will be described in more detail with reference to FIG. 3. FIG. 3 is a block diagram of the client 100 according to the present invention.

Referring to FIG. 3, the client 100 includes a transmission/reception unit 110, a video data processor 120, a user interface unit 130, a robot control velocity calculation unit 140, and a robot control message generation unit 150.

The transmission/reception unit 110 communicates with the URC server 200, transmits a robot control message to the URC server 200 at the request of the user, and receives video data frames for an image captured by the robot 300 from the URC server 200.

The video data processor 120 processes the received video data frames for transmission to the user interface unit 130, calculates the number of video data frames received per second, and provides the calculated number to the robot control velocity calculation unit 140.

The user interface unit 130 may include a display device such as a Liquid Crystal Display (LCD) and an input device such as a touch panel or a keypad. The user interface unit 130 displays a robot control screen and receives a robot control command from the user through the robot control screen.

Figure 4:
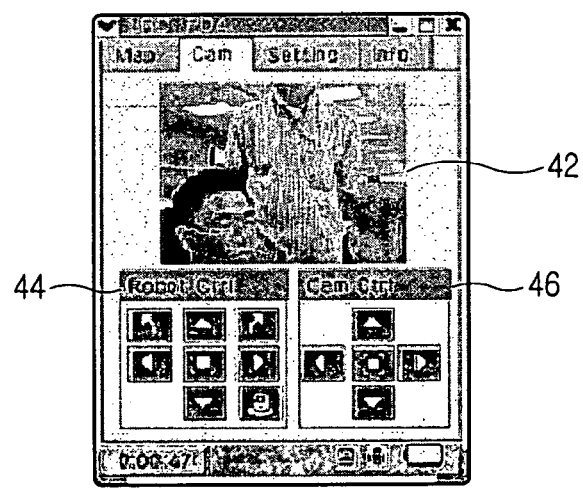
FIG. 4 illustrates a robot control screen of a client according to the present invention.

FIG. 4 illustrates the robot control screen of the client 100 according to the present invention. Referring to FIG. 4, the robot control screen includes a video data display window 42 for displaying video data, a robot movement control command input window 44 for receiving a command for controlling the movement of the robot 300, and a robot camera control command input window 46 for receiving a command for controlling a camera operation of the robot 300.

The user interface unit 130 displays video data from the robot 300 processed by the video data processor 130 on the video data display window 42 and receives the robot control command from the user through the robot movement control command input window 44 and the robot camera control command input window 46. The user can select a command button on the robot movement control command input window 44 and the robot camera control command input window 46 for controlling the robot 300 while viewing an image displayed on the video data display window 42.

The robot control velocity calculation unit 140 calculates a robot control velocity according to the number of video data frames per second, which is calculated by the video data processor 120. According to the present invention, the robot control velocity calculation unit 140 calculates a new robot control velocity $V_{new}$ by multiplying a preset default robot velocity by a velocity weight according to the number $f_c$ of video data frames received per second by the client 100.

The robot control message generation unit 150 generates a robot control message for controlling the robot 300 to perform a predetermined operation and encapsulates robot velocity information according to the calculated new robot control velocity $V_{new}$ into the robot control message. The robot velocity information may be a robot movement velocity or a robot camera velocity. The robot control message generation unit 150 transmits the robot control message including the robot velocity information according to the calculated new robot control velocity $V_{new}$ to the URC server 200 through the transmission/reception unit 110.

Figure 5:
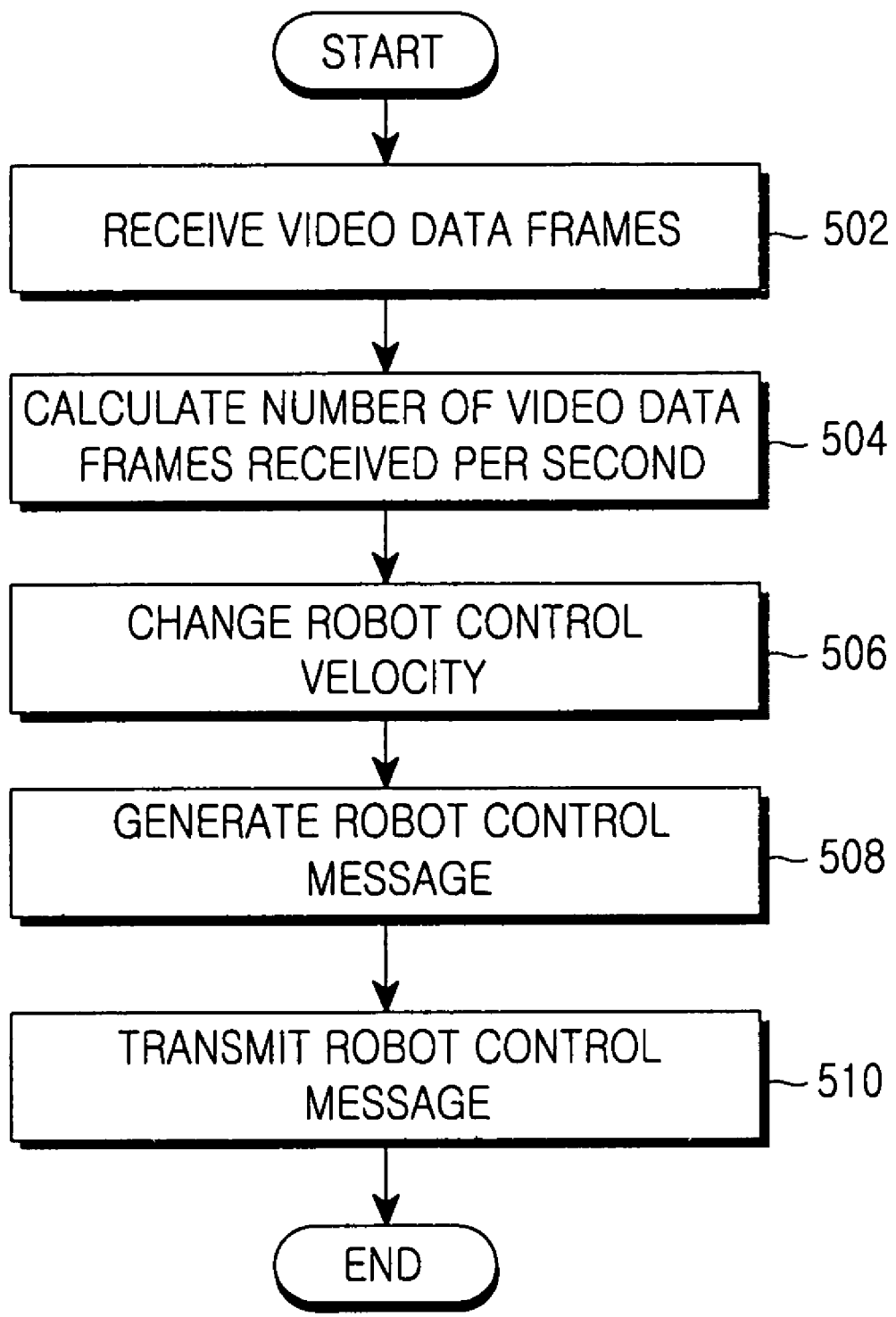
FIG. 5 is a flowchart illustrating a robot velocity control process at a client according to the present invention.

The robot velocity control method of the client 100 as structured above will be described in more detail with reference to the flowchart of FIG. 5 which illustrates a robot velocity control process at the client 100 according to the present invention. Referring to FIG. 5, the client 100 receives video data frames in step 502. In other words, the client 100 receives video data frames for an image captured by the robot 300 from the URC server 200.

Upon reception of the video data frames of the robot 300, the client 100 displays the received video data frames and calculates the number of video data frames received per second in step 504. In other words, the client 100 calculates how many frames are received per second.

The client 100 changes a robot control velocity according to the calculated number of video data frames received per second in step 506. For example, the client 100 calculates the new robot control velocity $V_{new}$ by multiplying a preset default robot velocity by a velocity weight according to the number $f_c$ of video data frames received per second by the client 100.

According to the present invention, the robot control velocity can be calculated according to Equation (1) as follows:

$$V_{new} = V_{base} \times a$$

$$a = f_c/f_{max} (0 \leq f_c \leq f_{max}) \text{ or } a = \log_2(f_c/f_{max}+1) \quad (0 \leq f_c \leq f_{max}) \tag{1}$$

where $V_{new}$ indicates a calculated new robot control velocity, $V_{base}$ indicates a preset default robot velocity, a indicates a velocity weight, $f_c$ indicates the number of video data frames received per second, and $f_{max}$ indicates the maximum number of video data frames per second.

As can be seen from Equation (1), the robot control velocity calculation unit 140 calculates the new robot control velocity $V_{new}$ by multiplying the preset default robot velocity $V_{base}$ by the velocity weight a according to the number $f_c$ of video data frames received per second by the client 100.

According to the present invention, the velocity weight a may be determined as $a=f_c/f_{max}(0 \leq f_c \leq f_{max})$ or $a=\log_2(f_c/f_{max}+1)(0 \leq f_c \leq f_{max})$.

FIG. 6 illustrates velocity weight graphs according to the present invention.

Referring to FIG. 6, a horizontal axis indicates a ratio $f_c/f_{max}$ of the number of video data frames actually received per second to the maximum number of video data frames per second and a vertical axis indicates the velocity weight a.

Figure 6A:
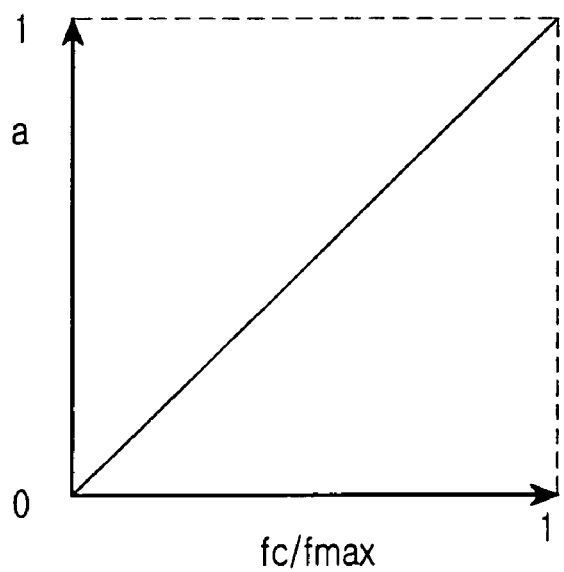
FIGS. 6A and 6B illustrate velocity weight graphs according to the present invention.

In FIG. 6A, the velocity weight a is determined as $a=f_c/f_{max}(0 \leq f_c \leq f_{max})$. In (a) of FIG. 6, the velocity weight a is proportional to the ratio $f_c/f_{max}$.

Thus, when the number $f_c$ of video data frames received per second by the client 100 is large, the new robot control velocity $V_{new}$ is also large. When the number $f_c$ of video data frames received per second by the client 100 is small, the new robot control velocity $V_{new}$ is also small.

There is a high possibility of interruption in the display of video data in case of $f_c/f_{max}$ being small, and thus the velocity of the robot 300 should be increased by a large amount. Video data can be normally displayed even when a maximum number of video data frames are not received in case of $f_c/f_{max}$ being large, and thus it is not necessary to increase the velocity of the robot 300 by a large amount.

Thus, it is preferable that the amount of increase in the velocity weight a be large in case of $f_c$ being small and the amount of increase in the velocity weight a be small in case of $f_c$ being large.

To this end, according to the present invention, the velocity weight a is determined as $a=\log_2(f_c/f_{max}+1)(0 \leq f_c \leq f_{max})$.

Figure 6B:
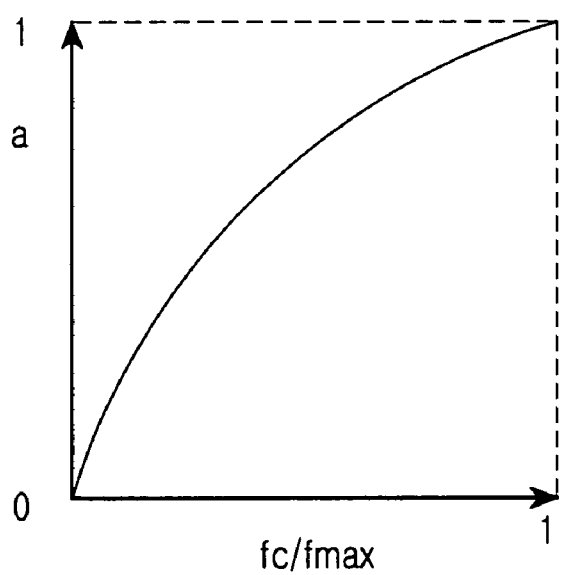

In FIG. 6B, the velocity weight a is determined as $a=\log_2(f_c/f_{max}+1)(0 \leq f_c \leq f_{max})$. Referring to FIG. 6B, since the number $f_c$ of video data frames received per second by the client 100 is large in case of $f_c/f_{max}$ being small, the amount of increase in the velocity weight a is large. Since the number $f_c$ of video data frames received per second by the client 100 is small in case of $f_c/f_{max}$ being large, the amount of increase in the velocity weight a is small even when the number $f_c$ of video data frames received per second increases.

The client 100 determines the velocity weight a according to the number $f_c$ of video data frames received per second and calculates the new robot control velocity $V_{new}$ by multiplying the preset default robot velocity $V_{base}$ by the velocity weight a. The client 100 changes the robot control velocity according to the calculated new robot control velocity $V_{new}$.

The client 100 then generates a robot control message including the robot control velocity according to the calculated new robot control velocity $V_{new}$ in step 508. The robot control message is used for controlling the robot 300 to perform a predetermined operation and includes a robot control velocity field. The robot control velocity field includes a field for controlling a robot movement velocity and a field for controlling a robot camera velocity.

Figure 7A:
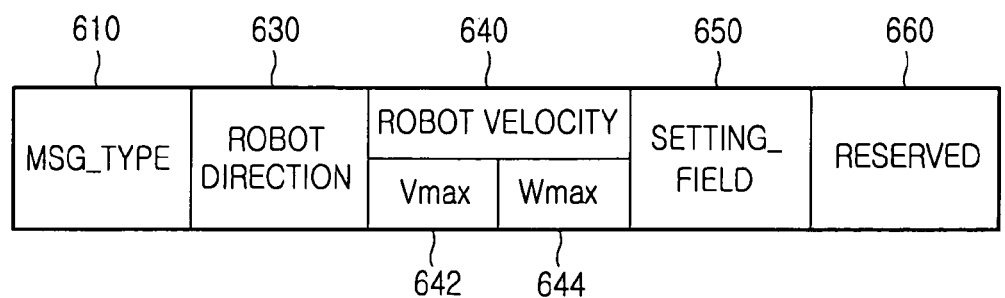
FIGS. 7A and 7B illustrates robot control message structures according to the present invention.
Figure 7B:
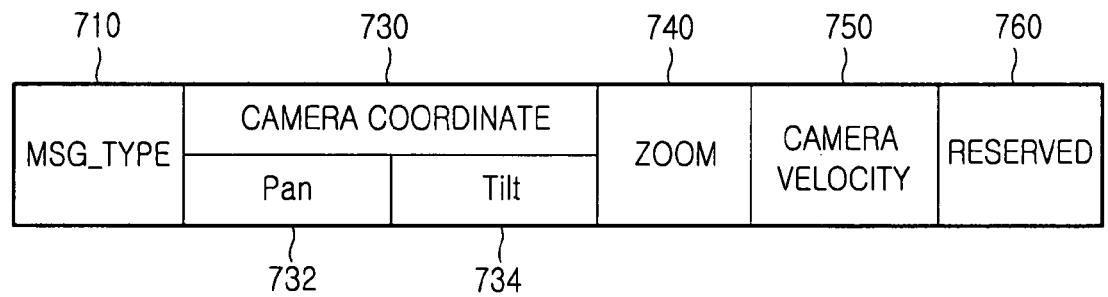

FIGS. 7A an 7B illustrates robot control messages according to the present invention. FIG. 7A illustrates a robot control message for controlling a robot movement velocity, and FIG. 7B illustrates a robot control message for controlling a robot camera velocity.

Referring to FIG. 7A, the robot control message for controlling the robot movement velocity includes an MSG_TYPE field 610, a Robot direction field 630, a Robot Velocity field 640, a Setting field 650, and a reserved field 660.

The MSG_TYPE field 610 includes information indicating that the robot control message is a message for controlling the robot movement velocity.

The Robot direction field 630 is a field for controlling the direction of the robot 300 and includes information about a direction in which the robot 300 is to be controlled.

The Robot Velocity field 640 is a field for controlling the movement velocity of the robot 300 and includes a $v_{max}$ (robot maximum linear velocity) field 642 and a $w_{max}$ (robot maximum angular velocity) field 644 that are changed by the calculated new robot control velocity $V_{new}$.

The calculated new robot control velocity $V_{new}$ may include a calculated new robot linear velocity $v_{new}$ and a calculated new robot angular velocity $w_{new}$. A linear velocity indicates a velocity in the movement direction of the robot 300 when the robot 300 moves along straight lines, and an angular velocity indicates a velocity in the rotation direction of the robot 300 when the robot 300 rotates.

According to the present invention, the new robot linear velocity $v_{new}$ is calculated according to equation (2) as follows:

$$v_{new}=v_{base} \times a$$
$$a=f_c/f_{max}(0 \leq f_c \leq f_{max}) \text{ or } a=\log_2(f_c/f_{max}+1)$$
$$(0 \leq f_c \leq f_{max}) \qquad (2),$$

where $v_{new}$ indicates a calculated new robot linear velocity, $v_{base}$ indicates a preset default robot linear velocity, a indicates a velocity weight, $f_c$ indicates the number of video data frames received per second, and $f_{max}$ indicates the maximum number of video data frames per second.

According to the present invention, the new robot angular velocity $w_{new}$ is calculated according to Equation (3) as follows:

$$w_{new}=w_{base} \times a$$
$$a=f_c/f_{max}(0 \leq f_c \leq f_{max}) \text{ or } a=\log_2(f_c/f_{max}+1)$$
$$(0 \leq f_c \leq f_{max}) \qquad (3),$$

where $w_{new}$ indicates a calculated new robot angular velocity, $w_{base}$ indicates a preset default robot angular velocity, a indicates a velocity weight, $f_c$ indicates the number of video data frames received per second, and $f_{max}$ indicates the maximum number of video data frames per second.

According to the present invention, the $v_{max}$ field 642 of the Robot Velocity field 640 includes the calculated new robot linear velocity $v_{new}$ and the $w_{max}$ field 644 of the Robot Velocity field 640 includes the calculated new robot angular velocity $w_{new}$. The unit of the linear velocity is m/sec and the unit of the angular velocity is degree/sec. For example, if the calculated new robot linear velocity $v_{new}$ is 50 m/sec and the calculated new robot angular velocity $w_{new}$ is 20 degree/sec, the robot maximum linear velocity $v_{max}$ may be 50 m/sec and the robot maximum angular velocity $w_{max}$ may be 20 degree/sec.

The Setting field 650 is a field for determining whether to use an obstacle avoiding function of the robot 300 and includes a value for indicating the use of the obstacle avoiding function. For example, when the obstacle avoiding function is used, the Setting field 650 may include 0000 0001. When the obstacle avoiding function is not used, the Setting field 650 may include 0000 0000.

The Reserved field 660 may be used as a flag value or for voice recognition.

Referring to FIG. 7B, the robot control message for controlling a robot camera velocity includes an MSG_TYPE field 710, a Camera Coordinate field 730, a Zoom field 740, a Camera Velocity field 750, and a Reserved field 760.

The MSG_TYPE field 710 includes information indicating that the robot control message is a message for controlling the robot camera velocity.

The Camera Coordinate field 730 is a field for controlling left/right and up/down movements of a camera and includes a Pan field 732 and a Tilt field 734. When the Pan field 732 indicates a left/right movement coordinate, in which a (−) value means movement to the right and a (+) value means movement to the left. The Tilt field 734 indicates an up/down movement coordinate, in which a (−) value means upward movement and a (+) value means downward movement. For example, when the camera is controlled to move to the right at 30° and downwardly at 50°, the Pan field 732 and the Tilt field 744 indicate (−30, 50).

The Zoom field 740 is a field for controlling zoom-in/out of the camera and includes a zoom-in/out ratio at which a camera lens zooms in or out.

The Camera Velocity field 750 is a field for controlling a robot camera velocity and includes the robot camera velocity.

According to the present invention, the robot camera velocity is calculated according to Equation (4) as follows:

$$v\_camera_{new} = v\_camera_{base} \times a$$

$$a = f_c/f_{max} (0 \leq f_c \leq f_{max}) \text{ or } a = \log_2(f_c/f_{max}+1)$$
$$(0 \leq f_c \leq f_{max}) \quad (4),$$

where $v\_camera_{new}$ indicates a calculated new robot camera velocity, $v\_camera_{base}$ indicates a preset default robot camera velocity, a indicates a velocity weight, $f_c$ indicates the number of video data frames received per second, and $f_{max}$ indicates the maximum number of video data frames per second. The robot camera velocity means the velocity of a left/right or up/down movement or a zoom-in/out operation.

The Reserved field 760 may be used as a flag or for voice recognition.

After generation of the robot control message, the client 100 transmits the generated robot control message to the robot 300 through the URC server 300 in step 510.

The robot 300 then receives the robot control message from the URC server 200 and changes its movement velocity or camera velocity according to the robot movement velocity or the robot camera velocity included in the robot control message.

As described above, according to the present invention, a robot movement velocity is controlled according to the video data reception state of a client, thereby allowing a user to easily control a robot regardless of the performance of the client.

In other words, according to the present invention, a robot movement velocity is controlled according to the video data reception state of a client, thereby making it possible to seamlessly and smoothly display video data from a robot on a screen of the client even when the number of received video data frames is small. Therefore, a user can easily control a robot while viewing video data displayed on the screen of the client.

Furthermore, according to the present invention, a robot control message for controlling a robot movement velocity is structured as a simple packet, thereby facilitating communication between a client and a server in controlling the robot movement velocity.

While the present invention has been shown and described with reference to a preferred embodiment thereof, it will be understood by those skilled in the art that various changes in form and details may be made therein without departing from the spirit and scope of the invention.

What is claimed is:

1. A network-based robot control system comprising:
 a robot for providing video data frames captured by performing a predetermined operation and changing a robot velocity according to a robot control velocity included in a received robot control message;
 a client for receiving the video data frames captured by the robot through a server, calculating the robot control velocity according to its video data frame reception state, generating the robot control message including the robot control velocity, and transmitting the robot control message to the robot through said server; and
 said server receiving the video data frames provided from the robot, receiving client type information of the client, changing the received video data based on the client type information of the client, and transmitting the changed video data to the client for calculating the robot control velocity.

2. The network-based robot control system of claim 1, wherein the client calculates the robot control velocity according to the number of received data frames.

3. The network-based robot control system of claim 1, wherein the client calculates a new robot control velocity by multiplying a preset default robot velocity by a velocity weight according to the number of received video data frames.

4. The network-based robot control system of claim 1 wherein the robot control velocity is calculated as follows:

$$V_{new} = V_{base} \times a$$

$$a = f_c/f_{max} (0 \leq f_c \leq f_{max})'$$

where $V_{new}$ indicates the calculated new robot control velocity, $V_{base}$ indicates a preset default robot velocity, a indicates the velocity weight, $f_c$ indicates the number of video data frames received per second, and $f_{max}$ indicates the maximum number of video data frames per second.

5. The network-based robot control system of claim 3, wherein the robot control velocity is calculated as follows:

$$V_{new} = V_{base} \times a$$

$$a = f_c/f_{max} (0 \leq f_c \leq f_{max})'$$

where $V_{new}$ indicates the calculated new robot control velocity, $V_{base}$ indicates the preset default robot velocity, a indicates the velocity weight, $f_c$ indicates the number of video data frames received per second, and $f_{max}$ indicates the maximum number of video data frames per second.

6. The network-based robot control system of claim 1 wherein the robot control velocity is calculated as follows:

$$V_{new} = V_{base} \times a$$

$$a = \log_2(f_c/f_{max}+1)(0 \leq f_c \leq f_{max})'$$

where $V_{new}$ indicates the calculated new robot control velocity, $V_{base}$ indicates a preset default robot velocity, a indicates the velocity weight, $f_c$ indicates the number of video data frames received per second, and $f_{max}$ indicates the maximum number of video data frames per second.

7. The network-based robot control system of claim 1, wherein the robot control velocity includes a robot movement velocity.

8. The network-based robot control system of claim 3, wherein the robot control velocity is calculated as follows:

$$V_{new} = V_{base} \times a$$

$$a = \log_2(f_c/f_{max}+1)(0 \leq f_c \leq f_{max})'$$

where $V_{new}$ indicates the calculated new robot control velocity, $V_{base}$ indicates the preset default robot velocity, a indicates the velocity weight, $f_c$ indicates the number of video data frames received per second, and $f_{max}$ indicates the maximum number of video data frames per second.

9. The network-based robot control system of claim 7, wherein the robot movement velocity includes a linear velocity in the movement direction of the robot and a rotation angular velocity in the rotation direction of the robot.

10. The network-based robot control system of claim 1, wherein the robot control velocity includes a robot camera velocity.

11. The network-based robot control system of claim 10, wherein the robot camera velocity includes the velocity of an up/down or left/right movement and a zoom-in/out operation of a camera of the robot.

12. The network-based robot control system of claim 1, wherein the client comprises:
   a transmission/reception unit for receiving video data packets captured by the robot from the server and transmitting the robot control message to the server;
   a video data processor for calculating the number of video data frames received per second;
   a robot control velocity calculation unit for calculating the robot control velocity according to the calculated number of video data frames received per second;
   a user interface unit for displaying the processed video data frames; and
   a robot control message generation unit for generating the robot control message including the robot control velocity.

13. The network-based robot control system of claim 12, wherein the robot control velocity calculation unit calculates a new robot control velocity by multiplying a preset default robot velocity by a velocity weight according to the number of video data frames received per second.

14. The network-based robot control system of claim 1, wherein the server transmits the video data frames to the client after changing the number of video data frames provided from the robot according to a processing performance criteria of the client.

15. The network-based robot control system of claim 1, wherein the server transmits the video data frames to the client after changing the quality of the video data frames provided from the robot according to a processing performance criteria of the client.

16. The network-based robot control system of claim 1, wherein the client type information indicates that the client is one of a personal computer, a cell phone, and Personal Digital Assistant (PDA) including a wireless communication unit.

17. A method for controlling movement of a robot in a network-based robot control system, the network-based robot control system including the robot, a client, and a server for communicating with the robot and the client, the method comprising:
   receiving, by the server, video data frames captured by the robot;
   receiving, by the server, a client type information of the client;
   changing, by the server, a number of the received video data frames based on the received client type information of the client;
   transmitting, from the server to the client, the changed number of the received video data frames; and changing, by the client, a robot control velocity corresponding to the changed number of the received video data frames per second.

18. The method of claim 17, further comprising:
   generating, by the client, a robot control message including the robot control velocity; and
   transmitting, from the client to the server, the robot control message.

19. The method of claim 18, wherein the robot control velocity includes a robot movement velocity.

20. The method of claim 19, wherein the robot movement velocity includes a linear velocity in the movement direction of the robot and a rotation angular velocity in the rotation direction of the robot.

21. The method of claim 18, wherein the robot control velocity includes a robot camera velocity.

22. The method of claim 21, wherein the robot camera velocity includes a velocity of an up/down or left/right movement and a zoom-in/out operation of a camera of the robot.

23. The method of claim 18, wherein the robot control velocity is calculated by determining a velocity weight according to the number of received video data frames, and multiplying a preset default robot velocity by the determined velocity weight.

24. The method of claim 18, further comprising:
   receiving, by the server, the robot control message including the robot control velocity; and
   transmitting, from the server to the robot, the robot control message.

25. The method of claim 24, further comprising changing, by the robot, its velocity according to the robot control velocity included in the robot control message.

26. The method of claim 17, wherein the client type information indicates that the client is one of a personal computer, a cell phone, and Personal Digital Assistant (PDA) including a wireless communication unit.

27. The method of claim 17, wherein the client type information includes information of the client's processing performance for receiving and processing video data frames.

* * * * *